United States Patent [19]

Camprincoli et al.

[11] 4,132,556

[45] Jan. 2, 1979

[54] REINFORCED CONGLOMERATES FOR THE CONSTRUCTION OR BUILDING INDUSTRY AND PROCESS FOR PREPARING THE SAME

[75] Inventors: Pierpaolo Camprincoli, Terni; Luciano Rosati, Stroncone (Terni), both of Italy

[73] Assignee: Montefibre S.p.A., Milan, Italy

[21] Appl. No.: 791,430

[22] Filed: Apr. 27, 1977

[30] Foreign Application Priority Data

Apr. 28, 1976 [IT] Italy .............................. 22770 A/76
Apr. 28, 1976 [IT] Italy .............................. 22771 A/76

[51] Int. Cl.² ................................................ C04B 7/02

[52] U.S. Cl. ................................... 106/90; 106/99; 106/111; 260/42.44

[58] Field of Search ........................... 106/99, 90, 111; 260/42.13, 42.44, 42.45

[56] References Cited

U.S. PATENT DOCUMENTS 3,865,779   2/1975   Oya et al. ............................... 106/99

Primary Examiner—James Poer

[57] ABSTRACT

There are disclosed new conglomerates for use in the construction or building industry and which consist of cement, gypsum, concrete and similar materials reinforced by additives which are modified polyolefin fibers plus, optionally, asbestos fibers. Processes for preparing the new and novel agglomerates are also disclosed.

7 Claims, No Drawings

REINFORCED CONGLOMERATES FOR THE CONSTRUCTION OR BUILDING INDUSTRY AND PROCESS FOR PREPARING THE SAME

THE PRIOR ART

It is known to use fibers of cotton, acetate rayon and other man-made fibers, including polyolefin fibers, as well as fibers of glass and steel for reinforcing cement-based conglomerates.

It is also known that, to obtain manufactured articles having satisfactory characteristics, it is necessary to achieve a good adhesion between cement, gypsum, concrete and the like, and the reinforcing fibers.

Various methods have been suggested for providing such adhesion, such as, for example, physically modifying the surface of the fibers, or incorporating therein various materials such as cement, stones, etc., coating the fibers with bonding or surface-active agents, etc. None of such methods, however, has solved the problem of satisfactorily insuring a satisfactory adhesion of the reinforcing fibers to the cement, gypsum, etc.

THE PRESENT INVENTION

We have now found that an excellent adhesion between polyolefin fibers and building materials such as cement, gypsum, concrete and similar materials, is obtained when said fibers are modified by adding thereto at least a compound selected from the group consisting of magnesium-containing silicates and oxides of metals belonging to group II A or III B of the (Mendelyeev) Periodic Table, in the form of a very fine powder.

The present invention, therefore, relates to conglomerates for the building industry consisting of cement, gypsum, concrete and similar materials and reinforced with polyolefin fibers containing at least a magnesium-containing silicate or at least an oxide of a metal group II A or III B of the (Mendelyeev) Periodic Table. Such conglomerates are characterized by an excellent resistance to cracking, which means they are particularly suitable for use in the building industry.

Examples of magnesium-containing silicates particularly suitable for being employed as modifiers of the polyolefin fibers, according to this invention, are: talc or steatite having the formula $Mg_3SiO_{10}(OH)_2$; tremolite $CaMg_3(SiO_3)_4$; serpentine $(MgO)_3(SiO_2)_2.2H_2O$; anthophyllite $Mg_7(Si_4O_{11})_2(OH)_2$; prochlorite $(MgO)_9.(Al_2O_3)(SiO_2)_5$ and the like. Such silicates may be either natural minerals or synthetic products.

Oxides of a metal belonging to group II A or III B of the [Mendelyeev] Periodic Table particularly suited to be employed as modifiers of the polyolefin fibers according to the present invention, are for example: calcium oxide, magnesium oxide, barium oxide, strontium oxide, aluminium oxide, etc.

The modified fibers to be employed as reinforcement of the cement-based conglomerates are prepared by admixing 0.5 to 30% by weight of at least one of the compounds mentioned above with the polyolefin, by spinning the resulting mixtures using conventional melt-spinning devices and by stretching and cutting the filaments so obtained into staple fibers, the length of which can vary from 1 to 100 mm.

The polyolefin preferably employed is polypropylene consisting prevailingly, for over 50%, of isotactic macromolecules and obtained by the stereo-specific polymerization of propylene.

However, equally useful for the achievement of the objects of this invention are the polyolefine obtained by homo- or copolymerization of monomers having the formula $$R - CH = CH_2$$

wherein R is an alkyl group, an aryl group or a hydrogen atom, such as polyethylene, ethylene/propylene crystalline copolymers containing prevailingly propylene, polybutene-1, polypentene-1, poly-4-methyl-pentene-1, polystyrene and the like.

The spinning process may be carried out by means of spinnerets with holes having either circular or non-circular sections, such as X-, Y-sections, triangular, star or lobed sections, U-sections and the like.

Optionally, before spinning, the mixtures may be mixed with opacifiers, pigments, dyes, antistatic agents, stabilizers and the like.

The reinforced conglomerates for the building industry of the present invention, are prepared by mixing, in concrete mixers or in similar homogenizing apparatuses, cement, gypsum, concrete and the like, either with or without sand, with 0.1-20% of fibers modified with at least a magnesium-containing silicate or an oxide of a metal of group II A or III B of the [Mendelyeev] Periodic Table and, optionally, with asbestos fibers and molding the manufactured articles according to conventional methods.

The present reinforced conglomerates are used in the preparation of precompressed, corrugated or flat plates, of pipes, fittings, tanks, crack-proof plasterings, panels for the building industry and prefabricated parts in general.

The following measurements are made on the new conglomerates:

(1) Determination of the adhesion of the fibers to the conglomerate

After having prepared standard specimens and having caused the impact breakage of same, the area of the broken section is examined under an electron microscope.

This examination reveals the difference between the fibers adhering to cement, which, in consequence, do not slip off, and those that do not adhere thereto and, therefore, slip off.

(2) Resistance to cracking

This method is useful for evaluating the energy necessary to cause the cracking of a specimen of a fibers-reinforced conglomerate. The measurement is taken by means of an Izod pendulum, equipped with a 10 kg/cm Sharpy ram. The test consists in finding the angle of fall of the pendulum ram that brings about cracking of the specimen. Once the angle of fall causing 50% of the cracks has been found, the cracking energy is calculated in $kg.cm/cm^2$.

(3) Dynamic flexural strength

The purpose of this test is to determine the tensile flexural strength and the elasticity modulus under a dynamic stress. The test is carried out as follows: a rectangular-section specimen is positioned on two adjustable supports and, in proximity to the center line, subjected to a gradually increasing flexural stress. The tests consists in determining the ultimate tensile strength and the amount of deflection. The most suitable apparatus is an Instrom dynamometer, or another constant speed device of similar type. Both breaking energy and flexural elasticity modulus are expressed in $kg/cm^2$.

(4) Static flexural strength

This is based on the principle of the beam supported at its ends, with a load concentrated in its center. After application of the load, the beam is freed from the support opposed to the applied weight, and the deflection is read.

The same procedure is followed to measure the tensile strength, varying the weight from time to time, until the load necessary to cause 50% of breakages of the specimens is found. Both tensile strength and elasticity modulus are expressed in kg/cm².

The following examples are given to illustrate the invention in more detail and are not intended to be limiting.

EXAMPLE 1

Modified reinforcing fibers having a count of 17 dtex, were prepared from a mixture consisting of:

| | |
|---|---|
| polypropylene having a melt index of 21, a residue on extraction with heptane of 98.1% and an ash content of 160 ppm: | 95 kg |
| powdered calcium oxide: | 5 kg |
| calcium stearate: | 0.1 kg | by spinning, stretching, according to a ratio of 3.25, and cutting the obtained filaments into staple fibers having a length of 6 mm.

Into a 1 m³ concrete mixer, the following was introduced:

| | |
|---|---|
| water: | 550 l |
| 425 Portland cement: | 220 kg |
| modified staple fibers: | 2.5 kg |
| asbestos fibers: | 28.5 kg | and the whole was stirred for one hour. Using the so obtained homogenized material, through molding by filtering and pressing (300 kg/cm² in a Carver press), tiles measuring 20 × 20 × 1.2 cm were prepared, on which the following measurements were carried out:

| | |
|---|---|
| static flexural strength | |
| tensile strength: | 260 kg/cm² |
| dynamic flexural strength | |
| tensile strength: | 200 kg/cm² |
| flexural elasticity modulus: | 15,000 kg/cm² |
| cracking energy: | 1.20 kg/cm/cm². |

The reinforced conglomerate so prepared proved to be particularly useful in the manufacture of prefabricated parts for the building industry.

EXAMPLE 2

By repeating Example 1 but substituting the calcium oxide of Example 1 with talc in the same amount, the tiles obtained showed the following characteristics:

| | |
|---|---|
| static flexural strength | |
| tensile strength: | 230 kg/cm² |
| dynamic flexural strength | |
| tensile strength: | 200 kg/cm² |
| flexural elasticity modulus: | 15,000 kg/cm² |
| cracking energy | 1.41 kg·cm/cm² |

EXAMPLE 3

Proceeding as in Example 1, but starting with a mixture consisting of:

| | |
|---|---|
| polypropylene, having a melt index of 21, a residue on extraction with heptane of 98.1% and an ash content of 160 ppm: | 90 kg |
| powdered calcium oxide: | 10 kg |
| calcium stearate: | 0.1 kg |

The resulting tiles exhibited the following characteristics:

| | |
|---|---|
| static flexural strength | |
| tensile strength: | 245 kg/cm² |
| dynamic flexural strength | |
| tensile strength: | 198 kg/cm² |
| flexural elasticity modulus: | 15,000 kg/cm² |
| cracking energy: | 1.22 kg·cm/cm² |

The reinforced conglomerate so prepared was particularly suitable for the manufacture of prefabricated parts for the building industry. By using talc instead of calcium oxide, the tiles obtained showed the following characteristics:

| | |
|---|---|
| static flexural strength | |
| tensile strength | 240 kg/cm² |
| dynamic flexural strength | |
| tensile strength: | 207 kg/cm² |
| flexural elasticity modulus | 14,700 kg/cm² |
| cracking energy | 1.38 kg·cm/cm² |

EXAMPLE 4

The following materials were introduced into a 1 m³ concrete mixer:

| | |
|---|---|
| water: | 550 l |
| 425 Portland cement: | 220 kg |
| modified polypropylene staple fibers as in Example 1: | 2.5 kg |

The mixture was stirred for 1 hour. Then, using the homogenized material obtained and operating according to the modalities of Example 1, tiles measuring 20 × 20 × 1.2 cm were manufactured. The tiles exhibited the following characteristics:

| | |
|---|---|
| static flexural strength | |
| tensile strength: | 80 kg/cm² |
| dynamic flexural strength | |
| tensile strength: | 105 kg/cm² |
| flexural elasticity modulus: | 15,000 kg/cm² |
| cracking energy: | 0.70 kg·cm/cm². |

The photographs taken on an electron microscope Stereoscan, 25 and 250 magnifications, showed a perfect adhesion of the modified fibers to the conglomerate, evidenced by the breakages of the filaments in the breaking zone and by the cement particles adhered to the fibers themselves.

EXAMPLE 5

2.50 kg of modified fibers prepared according to Example 1, were blended for 5 minutes in a 1 m³ concrete mixer, with 550 l of water and 250 kg of gypsum. Successively, tiles measuring 20 × 20 × 1.2 cm were prepared by operating according to Example 1. The tests carried out on such tiles gave the following results:

| static flexural strength | |
|---|---|
| tensile strength: | 55 kg/cm$^2$ |
| dynamic flexural strength | |
| tensile strength: | 40 kg/cm$^2$ |
| cracking energy: | 0.25 kg·cm/cm$^2$. |

The same tiles not containing the modified fibers exhibited the following characteristics:

| static flexural strength | |
|---|---|
| tensile strength: | 35 kg/cm$^2$ |
| dynamic flexural strength | |
| tensile strength: | 30 kg/cm$^2$ |
| cracking energy: | 0.16 kg·cm/cm$^2$. |

EXAMPLE 6

Example 1 was repeated using polypropylene fibers modified by powdered aluminum oxide instead of calcium oxide. The tiles so obtained exhibited the following characteristics:

| static flexural strength | |
|---|---|
| tensile strength: | 245 kg/cm$^2$ |
| dynamic flexural strength | |
| tensile strength: | 210 kg/cm$^2$ |
| flexural elasticity modulus: | 15,500 KG/cm$^2$ |
| cracking energy: | 1.35 kg·cm/cm$^2$. |

The test was repeated using 5 kg of modified fiber and 23.5 kg of asbestos fiber; the tiles obtained exhibited the following characteristics:

| static flexural strength | |
|---|---|
| tensile strength: | 260 kg/cm$^2$ |
| dynamic flexural strength | |
| tensile strength: | 220 kg/cm$^2$ |
| flexural elasticity modulus: | 16,000 kg/cm$^2$ |
| cracking energy: | 1.40 kg·cm/cm$^2$ |

EXAMPLE 7

2.5 kg of a fiber modified with aluminum oxide and prepared according to Example 6, was blended for 5 minutes in a 1 m$^3$ concrete mixer with 250 kg of gypsum and 550 l of water.

Operating according to Example 1, tiles measuring 20 × 20 × 1.2 cm were prepared. The characteristics of the tiles so obtained were as follows:

| static flexural strength | |
|---|---|
| tensile strength: | 52 kg/cm$^2$ |
| dynamic flexural strength | |
| tensile strength: | 40 kg/cm$^2$ |
| cracking energy: | 0.28 kg·cm$^2$ |

EXAMPLE 8

Into a 1 m$^3$ concrete mixer the following was introduced:

| water: | 550 l |
|---|---|
| 425 Portland cement: | 220 kg |
| Polypropylene staple fibers obtained from 95 kg of the above-described polypropylene, 5 kg of talc and 0.1 of | |
| calcium stearate: | 2.5 kg |

The mixture was stirred for 1 h, then using the homogenized material obtained and operating according to the modalities of Example 1, tiles measuring 20 × 20 × 1.2 cm were manufactured. Such tiles exhibited the following characteristics:

| static flexural strength | |
|---|---|
| tensile strength: | 85 kg/cm$^2$ |
| dynamic flexural strength | |
| tensile strength: | 100 kg/cm$^2$ |
| flexural elasticity modulus: | 14,500 kg/cm$^2$ |
| cracking energy: | 0.65 kg·cm/cm$^2$ |

The photographs taken on an electron microscope Stereoscan, 25 and 250 magnifications, showed a perfect adhesion of the modified fibers to the conglomerate, evidenced by the breakages of the filaments in the break zone and by the cement particles tacked to the fibers themselves.

EXAMPLE 9

2,50 kg of modified staple fibers prepared according to Example 2 from a mixture consisting of 95 kg of polypropylene having a melt index of 21, a residue on the extraction with heptane of 98.1% and an ash content of 160 ppm, 5 kg of talc and 0.1 kg of calcium stearate, were blended for 5 minutes in a 1 m$^3$ concrete mixer, with 550 l of water and 250 kg of gypsum. Successively, tiles measuring 20 × 20 × 1.2 cm were prepared by operating according to Example 1. The tests carried out on the tiles gave the following results:

| static flexural strength | |
|---|---|
| tensile strength: | 60 kg/cm$^2$ |
| dynamic flexural strength | |
| tensile strength: | 45 kg/cm$^2$ |
| cracking energy: | 0.35 kg·cm/cm$^2$ |

Similar tiles but not containing the modified fibers exhibited the following characteristics:

| static flexural strength | |
|---|---|
| tensile strength: | 35 kg/cm$^2$ |
| dynamic flexural strength | |
| tensile strength: | 30 kg/cm$^2$ |
| cracking energy: | 0.16 kg·cm/cm$^2$ |

EXAMPLE 10

Example 1 was repeated using polypropylene fibers modified with powdered serpentine instead of calcium oxide.

The resulting tiles had the following characteristics:

| static flexural strength | |
|---|---|
| tensile strength: | 225 kg/cm$^2$ |
| dynamic flexural strength | |
| tensile strength: | 197 kg/cm$^2$ |
| flexural elasticity modulus | 14,500 kg/cm$^2$ |

| -continued | |
|---|---|
| cracking energy: | 1.37 kg · cm/cm² |

EXAMPLE 11

Example 1 was repeated, starting from a mixture consisting of:

| polypropylene having a melt index of 21, a residue on extraction with heptane of 98.1% and an ash content of 160 ppm: | 100 kg |
|---|---|
| calcium stearate: | 0.1 kg. |

The resulting tiles exhibited the following characteristics:

| static flexural strength | |
|---|---|
| tensile strength: | 200 kg/cm² |
| dynamic flexural strength | |
| tensile strength: | 180 kg/cm² |
| flexural elasticity modulus: | 14,000 kg/cm² |
| cracking energy: | 0.89 kg · cm/cm² |

We claim:

1. Reinforced conglomerates for use in the construction industry and which are resistant to bending and cracking, said conglomerates comprising a material of the group consisting of cement, gypsum and concrete and also comprising reinforcement consisting at least predominantly of polyolefin fibers containing 5% to 30% of at least one compound selected from the group consisting of magnesium-containing silicates and oxides of metals belonging to Group II A and Group III B of the Mendelyeev Periodic Table.

2. Reinforced conglomerates according to claim 1, in which the reinforcement also comprises asbestos fibers.

3. Reinforced conglomerates according to claim 1, in which the magnesium-containing silicate is selected from the group consisting of talc, tremolite, serpentine, anthophyllite and prochlorite.

4. Reinforced conglomerates according to claim 1, in which the oxide of a metal of Group II A or Group III B of the Mendelyeev Periodic Table is selected from the group consisting of calcium oxide, magnesium oxide, barium oxide, strontium oxide and aluminum oxide.

5. Reinforced conglomerates according to claim 1, in which the polyolefin fibers are fibers of polypropylene consisting prevailingly of isotactic macromolecules and obtained by the stereospecific polymerization of propylene.

6. Reinforced conglomerates according to claim 1, and consisting of a material of the group consisting of cement, gypsum and concrete, and of 0.1 to 20% by weight of polyolefin fibers containing 0.5 to 30% by weight of a compound selected from the group consisting of magnesium-containing silicates and oxides of metals belonging to Group II A and Group III B of the Mendelyeev Periodic Table.

7. A process for preparing reinforced conglomerates for the building industry according to claim 1, said process comprising:
   spinning a mixture based on a polyolefin and containing 0.5 to 30% by weight of at least one compound selected from the group consisting of magnesium-containing silicates and oxides of metals belonging to Group II A and Group III B of the Mendelyeev Periodic Table; stretching the fiber thus obtained; cutting the stretched fiber into staple fibers having a length of from 1.0 mm to 100 mm;
   blending the staple fibers in amounts of 0.1 to 20% with a material selected from the group consisting of cement, gypsum and concrete to obtain a homogenized mixture; and transforming the homogenized mixture into manufactured articles.

* * * * *